June 4, 1968  KOICHI FUJIKAWA  3,386,725
SEAT FRAME MEMBER

Filed April 3, 1967  2 Sheets-Sheet 1

INVENTOR
Koichi Fujikawa
BY Oldham & Oldham
ATTORNEY

INVENTOR
Koichi Fujikawa
BY Oldham & Oldham
ATTORNEY

United States Patent Office 3,386,725
Patented June 4, 1968

3,386,725
SEAT FRAME MEMBER
Koichi Fujikawa, 1696 Haijima-cho,
Akishima-shi, Tokyo, Japan
Filed Apr. 3, 1967, Ser. No. 627,791
1 Claim. (Cl. 267—110)

ABSTRACT OF THE DISCLOSURE

A frame member for engaging the end of a zig-zag spring. The frame member includes a hollow base with a hollow ridge extending axially thereof. Two axially spaced openings are provided in the ridge so that a spring end can be inserted therein. Means at the lower edges of the openings aid in securing the spring end to the frame member.

Résumé of invention

Frames for securing the ends of springs of the zig-zag type in position are provided. The frame includes a hollow ridge with a pair of spaced openings therein through which an end of the spring can be threaded to be secured to the frame and be fixedly positioned thereby.

The present invention relates to frames for securing springs, particularly to an automobile seat frame member adapted to secure ends of formed springs which constitute the seat springs.

Nowadays, formed springs of the so-called zig-zag type are widely used in manufacturing automobile seats instead of using complicated coil springs. However, troublesome problems exist is securing ends of such formed springs to a tubular lower frame. Namely, such end of the formed spring is generally fixed to the lower frame by applying a suitable fitting member applied over the end and bolting or welding to the frame, or by hooking to a bore drilled to the frame. The former method necessitates separate fitting members and bolts as well as the processes of drilling bolt holes and tapping the same or welding process, thereby resulting in useless complication of parts and of manufacturing procedure. The latter method also necessitates useless drilling step. Furthermore, in any conventional methods as explained in the above, unpleasant jarring noise necessarily arose from the rotation of the formed spring relative to the frame when the load of a human body is applied on the seat.

The present invention therefore has for its object to provide frame members adapted for firmly preventing such relative rotation of the formed spring end without using any additional parts, thereby completely eliminating any possibility of the jarring. Moreover, the frame member of this invention can achieve simplification of the manufacturing procedure and contribute to lower costs of the product.

Now, the invention will be explained more in detail with preferred embodiments illustrated in the accompanying drawings wherein.

Figure 1:
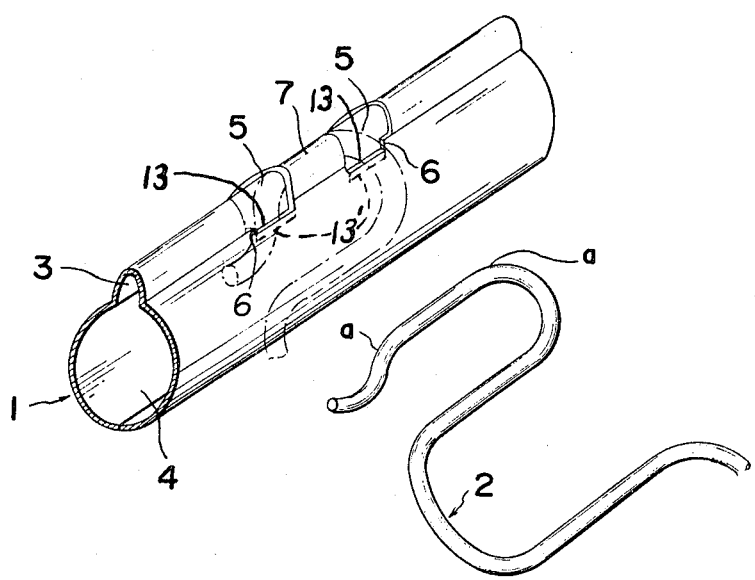
FIGURE 1 is a perspective view of a part of a frame member and an end of a formed spring to be secured to the frame member, embodying the present invention.

In the drawings, a reference numeral 1 shows a hollow frame member which is not a ready-made steel pipe, but is made by rolling or bending of a steel sheet and has a special cross-section by the presence of a ridge 3 on a usual circular cross-sectional base portion 4. This ridge 3, which runs in the axial direction throughout the length of the frame member 1, markedly reinforces the strength of the frame, and also is positively utilized to form a fitting for a formed, or zig-zag, spring 2. For this purpose, the sheet material is previously punched to form two openings at one side of the ridge 3, which openings have flattened configuration of holes 5 shown in FIGURE 1. Thus punched sheet material is then rolled to form the final special shape. The inner space defined by the intermediate part 7 between two holes 5, 5 is made of sufficient width and length to accommodate an end of the formed spring 2 which can be threaded thereinto. In the lower edge of each of the holes 5, a shoulder 6 is formed. By the shoulders 6, 6 the end of the formed spring 2 is firmly held at bent portions a, a. Or more precisely, the end of the formed spring 2 is inserted obliquely in parallel with the projection 3, to one of the holes, and is brought out from the other of the holes. Thereafter the bent portions a, a of the formed spring 2 are brought into contact with the shoulders 6, 6 by swingably pulling the formed spring downwards.

In this final position, the end of the formed spring is firmly fixed since the straight portion of the end (the portion between the points a, a) is accommodated within the intermediate part 7 of the ridge 3, and the bent points a, a of the end are held by the shoulders 6, 6. Accordingly, the formed spring is never rotated relative to the frame member 1 even if any load is applied on the seat, resulting in the elimination of any jarring noise. Moreover, any lateral deflection of the formed spring can be effectively prevented. The angle between the formed spring and the frame can be suitably varied within the range of 0°–70° by changing the height of the bottom 13 which is determined in the punching process of the sheet blank for the frame. A different height 13' is shown in dotted lines.

Figure 2:
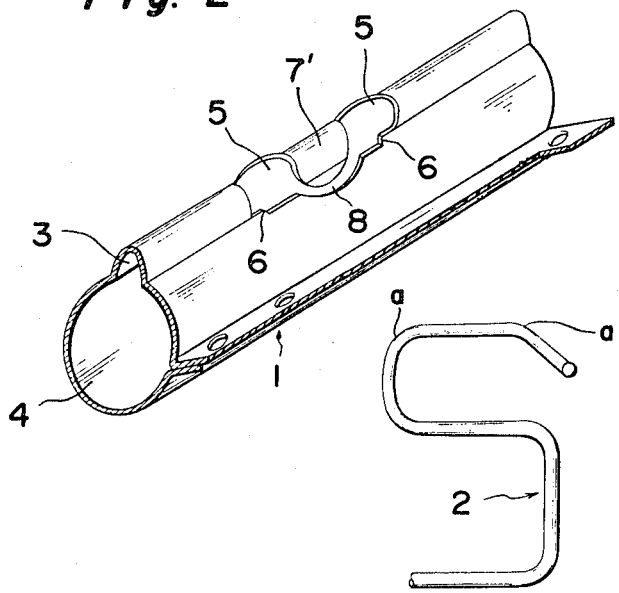
FIGURE 2 is a similar view showing another embodiment of the frame member.

In the modification shown in FIGURE 2, the lower part of the intermediate part 7' is cut away in an arcuate shape, to form a clearance 8 of which width is somewhat larger than the diameter of the formed spring 2. Such clearance 8 facilitates the assembling of the formed spring 2 since the latter can readily be fitted by initially inserting the last curved part of the spring 2 obliquely into the clearance 8. The fixing of the formed spring can be insured by clamping the intermediate part 7' against the spring end after the spring is set. This modification is particularly useful for an S-spring, and for the case that the other end of the spring is already secured and so the large angle of insertion is not allowed.

Figure 3:
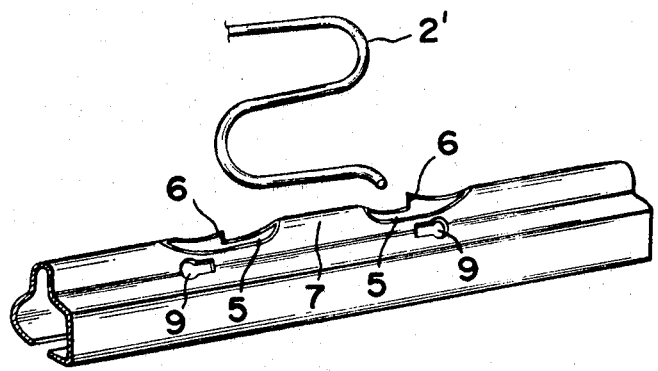
FIGURES 3 and 4 show further embodiments of this invention.

In another modification shown in FIGURE 3, the base portion of the frame member has a substantially square cross-section. Also a pair of holes 9, 9 are arranged at the boundary of the base and and the ridge 3b. The hole 9 is made in the shape of a key hole. By utilizing the hole 9, a cut end 20 of a formed spring 2' can be secured without necessitating any additional process to bend the spring end to the shape shown in FIGURE 1.

Figure 4:
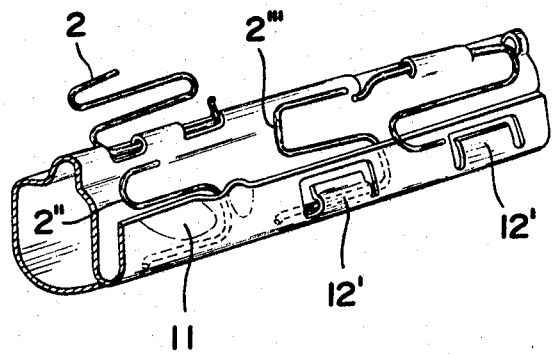

In a further modification shown in FIGURE 4, the end of a spring 2 is secured to a frame 1d as in the unit of FIGURE 1, and the base of the frame member 1d is formed an irregular cross-section and has an upwardly extending flange 10. By utilizing this flange 10, the ends of formed springs 2'' for a back board or other use can be secured by way of caulking and spot-welding (at a point 11) the flange 10 against the base, after the spring is inserted. Instead of such spot-welding method, a formed spring 2''' can also be secured by a clamping finger or member 12' cut or punched from the flange 10, as shown in the middle portion of FIGURE 4.

Although the present invention has been described in conjunction with specific embodiments, it will be understood that the principles of the invention are capable of general application and that those skilled in the art can be expected to make variations dictated by design requirements. It is intended, therefore, that such variations as are reasonably expected on the part of those skilled in the art and which incorporate the herein disclosed principles will be included within the scope of the following claim.

What is claimed is:

1. A frame member adapted for restraining ends of formed springs of the zig-zag type and where spaced portions of the wire forming the spring at the spring end are bent, made by rolling of a sheet metal, which comprises a hollow base of relatively large space, a hollow ridge formed on said base and extending axially the length of the base, said ridge having an inner dimension in cross section substantially the same as the wire forming the spring, two openings formed at spaced portions of said ridge for allowing the insertion of an end of the formed spring, and a pair of shoulders formed at the lower edges of said openings to hook the bent points of said end of the formed spring, thereby rigidly securing said end of the formed spring so as not to generate any jarring noise in loaded condition.

References Cited

UNITED STATES PATENTS 2,293,566   8/1942   Shanahan _____ 267—110
2,538,855   1/1951   Asaro _____ 267—110
3,275,357   9/1966   Tabor _____ 267—100 X ARTHUR L. LA POINT, *Primary Examiner.*